(12) United States Patent
Tao et al.

(10) Patent No.: US 12,007,324 B2
(45) Date of Patent: *Jun. 11, 2024

(54) SYSTEMS AND METHODS FOR pH SENSING IN FLUIDS

(71) Applicant: University of Maryland, College Park, College Park, MD (US)

(72) Inventors: Yang Tao, Potomac, MD (US); Anjana Hevaganinge, Rockville, MD (US); Chiao-Yi Wang, College Park, MD (US); Dongyi Wang, Fayetteville, AR (US); Mohamed Amr Ali, College Park, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/860,428

(22) Filed: Jul. 8, 2022

(65) Prior Publication Data

US 2023/0008019 A1 Jan. 12, 2023

Related U.S. Application Data

(60) Provisional application No. 63/219,701, filed on Jul. 8, 2021, provisional application No. 63/219,816, filed on Jul. 8, 2021.

(51) Int. Cl.
*G01N 21/3577* (2014.01)
*G01J 3/10* (2006.01)
(Continued)

(52) U.S. Cl.
CPC .......... *G01N 21/3577* (2013.01); *G01J 3/108* (2013.01); *G01J 3/2823* (2013.01);
(Continued)

(58) Field of Classification Search
CPC ............. G01N 21/3577; G01N 21/359; G01N 2201/126; G01N 21/05; G01N 2201/1296;
(Continued)

(56) References Cited

U.S. PATENT DOCUMENTS

2016/0148344 A1* 5/2016 Koga ........................ G06T 5/20
348/336
2018/0031480 A1* 2/2018 Sinclair .............. G01N 21/6428
(Continued)

OTHER PUBLICATIONS

Dusan Kojic, et al., "Water Confined in the Local Field of Ions" ChemPhysChem 15, pp. 4077-4086, (2014).
(Continued)

*Primary Examiner* — MD M Rahman
(74) *Attorney, Agent, or Firm* — George Likourezos; Carter, DeLuca & Farrell LLP

(57) ABSTRACT

A non-contact system for the sensing of pH includes a hyperspectral imaging device configured to capture a hyperspectral image of a fluid, a flow cell configured to enable the capturing of a hyperspectral image of a fluid, a process, and a memory. The memory includes instructions stored thereon, which, when executed by the processor, cause the system to generate a hyperspectral image of the fluid in the flow cell, generate several spectral signals based on the hyperspectral image, provide the spectral signal as an input to a machine learning network, and predict by the machine learning network a pH of a fluid.

21 Claims, 15 Drawing Sheets

(51) Int. Cl.
*G01J 3/28* (2006.01)
*G01N 21/359* (2014.01)

(52) U.S. Cl.
CPC .... *G01N 21/359* (2013.01); *G01J 2003/2843* (2013.01); *G01N 2201/126* (2013.01)

(58) Field of Classification Search
CPC .. G01J 3/108; G01J 3/2823; G01J 2003/2843; G01J 2003/283; G01J 2003/2833; G01J 2003/2836; G01J 2003/284; G01J 3/0264; G01J 2003/2826
USPC ......................................................... 356/303
See application file for complete search history.

(56) References Cited

U.S. PATENT DOCUMENTS

| | | | |
|---|---|---|---|
| 2021/0059607 A1* | 3/2021 | Gormley | A61B 5/0022 |
| 2022/0205905 A1 | 6/2022 | Rai | |

OTHER PUBLICATIONS

Dongyi Wang, et al., "Early Detection of Tomato Spotted Wilt Virus by Hyperspectral Imaging and Outlier Removal Auxiliary Classifier Generative Adversarial Nets" (OR-AC-GAN). Scientific Reports, 9, pp. 1-14 (2019).

Dusan Kojic, et al., "Improving accuracy and reproducibility of vibrational spectra for diluted solutions" Analytica Chimica Acta, 955, pp. 86-97 (2017).

Asmund Rinnan, et al., "Review of the most common pre-processing techniques for near-infrared spectra", Trends in Analytical Chemistry, vol. 28, No. 10, pp. 1201-1222 (2009).

karen A. Esmonde-White, et al., "The role of Raman spectroscopy in biopharmaceuticals from development to Manufacturing", Analytical and Bioanalytical Chemistry, pp. 1-23, (2021).

Jens Claßen, et al., "Spectroscopic sensors for in-line bioprocess monitoring in research and pharmaceutical industrial application", Anal Bioanal Chem., pp. 1-16, (2017).

U.S. Office Action issued by the United States Patent and Trademark Office in connection with U.S. Appl. No. 17/860,412, dated Feb. 1, 2024.

* cited by examiner

SYSTEMS AND METHODS FOR pH SENSING IN FLUIDS

CROSS-REFERENCE TO RELATED APPLICATION/CLAIM OF PRIORITY

This application is related to application U.S. patent application Ser. No. 17/860,412, entitled: "SYSTEMS AND METHODS FOR COMPOUND CONCENTRATION SENSING IN FLUIDS" filed Jul. 8, 2022, and claims the benefit of, and priority to, U.S. Provisional Patent Application No. 63/219,816 filed on Jul. 8, 2021. This application also claims the benefit of, and priority to, U.S. Provisional Patent Application No. 63/219,701 filed on Jul. 8, 2021. The entire contents of each of which are hereby incorporated herein by reference.

GOVERNMENT SUPPORT

This invention was made with government support under 70NANB17H002 awarded by the National Institute of Standards and Technology (NIST). The government has certain rights in the invention.

TECHNICAL FIELD

The present disclosure relates generally to the field of sensing pH of fluids. More specifically, an aspect of the present disclosure provides systems and methods for contactless sensing of pH in bioreactor fluids.

BACKGROUND

The biopharmaceutical industry is heavily reliant on bioreactor cell cultivation for efficient drug manufacture and production. Bioreactor cell cultivation requires heavy monitoring by highly trained scientists. Human errors can lead to disastrous consequences and thus, there is a pressing need for automated systems that can monitor cell culture health around the clock. In particular, poor pH monitoring during cell culture leads to abnormally low pH environments, which forces cells to favor glycolytic metabolism and enter a cycle in which the cells continue lowering the pH through lactic acid production until death. When media pH is not carefully monitored, the internal pH of the cell and the external pH of the environment are not balanced and thus, it is difficult to determine the true metabolic state of the cell using a macro-scale measurement. Poor pH monitoring leads to the quality of proteins produced by cells diminishing significantly.

Accordingly, there is interest in sensing pH of fluids.

SUMMARY

An aspect of the present disclosure provides a non-contact system for the sensing of pH. The system includes a hyperspectral imaging device configured to capture a hyperspectral image of a fluid, a flow cell configured to enable the capturing of a hyperspectral image of a fluid, a processor, and a memory. The memory includes instructions stored thereon, which, when executed by the processor, cause the system to generate a hyperspectral image of the fluid in the flow cell, generate a spectral signal based on the hyperspectral image, provide as an input to a machine learning network the spectral signal, and predict by the machine learning network a pH of a fluid.

In an aspect of the present disclosure, the flow cell may be attached to a pump that is configured to pump a filtered fluid into the flow cell.

In another aspect of the present disclosure, the fluid may pass through a cell media filter prior to the fluid being flowed into the flow cell.

In yet another aspect of the present disclosure, the machine learning network may include a convolutional neural network.

In accordance with further aspects of the present disclosure, the flow cell may include a transparent window configured for imaging the fluid.

In an aspect of the present disclosure, the instructions, when executed by the processor, may further cause the system to preprocess the hyperspectral signal to reduce noise, before providing the spectral signal to the machine learning network.

In another aspect of the present disclosure, the spectral signal may include transmittance readings and may further cause the system to convert the transmittance readings into absorbance readings.

In yet another aspect of the present disclosure, the transmittance readings may be converted into absorbance readings using $A(x,y,\lambda) = -\log_{10}(R(x,y,\lambda))$, where $(R(x,y,\lambda))$ is the hyperspectral cubic image, and $A(x,y,\lambda)$ is absorbance.

In yet another aspect of the present disclosure, the instructions, when executed by the processor, may further cause the system to filter the XY image plane to reduce noise in the absorbance readings.

In aspects, the instructions, when executed by the processor, may further cause the system to perform z-score-based masking to further remove background and noisy pixels from the absorbance readings.

An aspect of the present disclosure provides a computer-implemented method for sensing pH. The method includes capturing a hyperspectral image of a fluid within a flow cell by a hyperspectral imaging device, generating a spectral signal based on the hyperspectral image captured, providing the spectral signal as an input to a machine learning network, and predicting by the machine learning network a pH of the fluid.

In an aspect of the present disclosure, the flow cell may be attached to a pump that is configured to pump a filtered fluid into the flow cell.

In another aspect of the present disclosure, the fluid may pass through a cell media filter prior to the media being flowed through the flow cell.

In yet another aspect of the present disclosure, the machine learning network may include a convolutional neural network.

In accordance with further aspects of the present disclosure, the flow cell may include a transparent window configured for imaging the fluid.

In an aspect of the present disclosure, the method may further include preprocessing the spectral signal to reduce noise, before providing the spectral signal to the machine learning network.

In another aspect of the present disclosure, the spectral signal may include transmittance readings and may further cause the system to convert the transmittance readings into absorbance readings.

In yet another aspect of the present disclosure, the transmittance readings may be converted into absorbance readings using $A(x,y,\lambda) = -\log_{10}(R(x,y,\lambda))$ where $(R(x,y,\lambda))$ is the hyperspectral cubic image, and $A(x,y,\lambda)$ is absorbance.

In yet another aspect of the present disclosure, the computer-implemented method, when executed by the processor, may further cause the system to filter the XY image plane to reduce noise in the absorbance readings.

In aspects, the computer-implemented method, when executed by the processor, may further cause the system to perform z-score-based masking to further remove background and noisy pixels from the absorbance readings.

An aspect of the present disclosure provides a non-transitory computer-readable medium storing instructions. The method includes generating a hyperspectral image of a fluid within a flow cell by a hyperspectral imaging device, generating a spectral signal based on the hyperspectral image captured, providing as an input to a machine learning network the spectral signal, and predicting by the machine learning network a pH of the fluid.

Further details and aspects of the present disclosure are described in more detail below with reference to the appended drawings.

BRIEF DESCRIPTION OF THE DRAWINGS

A better understanding of the features and advantages of the present disclosure will be obtained by reference to the following detailed description that sets forth illustrative aspects, in which the principles of the present disclosure are utilized, and the accompanying drawings of which.

DETAILED DESCRIPTION

Figure 1:
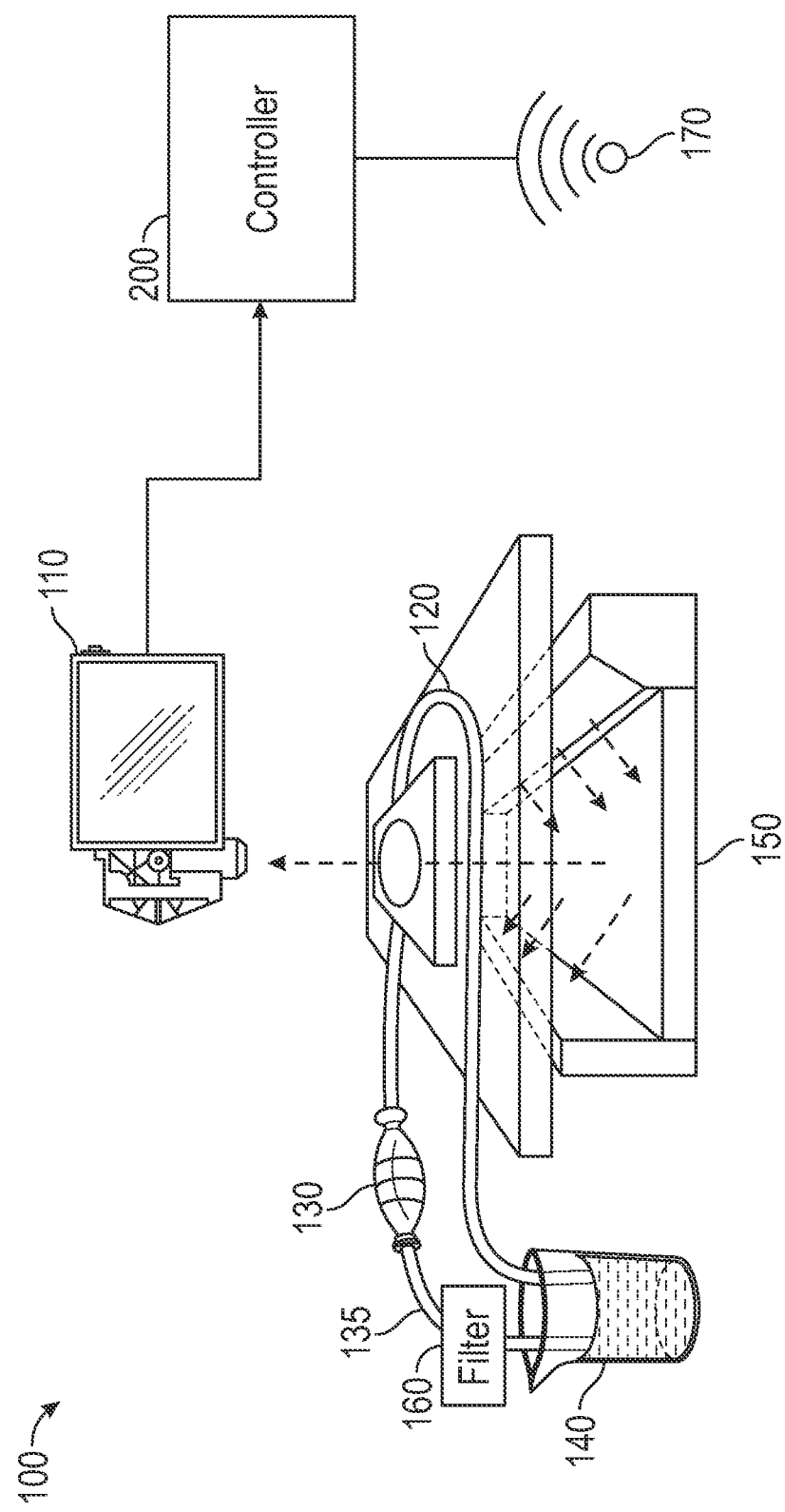
FIG. 1 is a diagram of a non-contact system for the sensing of pH, in accordance with aspects of the disclosure.

The present disclosure relates generally to the field of sensing pH of fluids. More specifically, an aspect of the present disclosure provides systems and methods for sensing the pH of bioreactor fluids. As used herein, the term sensing also includes, but is not limited to detecting, determining, measuring, and/or predicting.

Aspects of the present disclosure are described in detail with reference to the drawings wherein like reference numerals identify similar or identical elements.

Although the present disclosure will be described in terms of specific aspects and examples, it will be readily apparent to those skilled in this art that various modifications, rearrangements, and substitutions may be made without departing from the spirit of the present disclosure. The scope of the present disclosure is defined by the claims appended hereto.

For purposes of promoting an understanding of the principles of the present disclosure, reference will now be made to exemplary aspects illustrated in the drawings, and specific language will be used to describe the same. It will nevertheless be understood that no limitation of the scope of the present disclosure is thereby intended. Any alterations and further modifications of the novel features illustrated herein, and any additional applications of the principles of the present disclosure as illustrated herein, which would occur to one skilled in the relevant art and having possession of this disclosure, are to be considered within the scope of the present disclosure.

Referring to FIG. 1, a system 100 for pH sensing is shown. The system 100 is configured to sense the pH of a fluid, for example, a bioreactor fluid. The system 100 generally includes a hyperspectral imaging device 110 configured to capture a hyperspectral image of a fluid, a flow cell 120, and a controller 200. The system 100 may be used as a touchless pH sensor for bioreactor fluids using the hyperspectral imaging device 110 and deep learning methods for spectra analysis and pH prediction. The system 100 leverages the efficient spectral acquisition capabilities of the hyperspectral imaging device 110 to train and evaluate a machine learning network (e.g., 1D convolutional neural network (CNN) deep networks) for precise pH prediction (error < about 0.05 pH) in cell media. An aspect of the present disclosure is an online pH sensor configured for precise automated monitoring of cell culture in bioreactors. Although bioreactor fluids are discussed, the disclosed technology may be used to determine the pH of any fluid. The disclosed system 100 includes the benefit of providing a non-contact for spectra analysis and pH prediction.

The flow cell 120 is configured for enabling the imaging of the fluid. The flow cell 120 may be completely transparent and/or may include a transparent window. A flow cell 120 is a sample cell designed so that fluid samples may be continuously flowed through a beam path. New samples may be continually replenished such that continuous imaging is possible. In aspects, the flow cell 120 may be made of quartz or other transparent materials. In an aspect, the system 100 may use an imaging cell for imaging the fluid. The imaging cell may include micro cuvettes containing for example, a compound solution and/or deionized water.

In aspects, the system 100 may further include a pump 130 (e.g., a peristaltic pump) configured to pump the fluid from a source (e.g., a bioreactor 140) to the flow cell 120.

The pump 130 is configured to pump a fluid (e.g., cell media) into the flow cell 120. The system 100 may further include a cell media filter 160 configured to filter the fluid prior to the media being flowed into the flow cell 120. The pump 130 and/or cell media filter 160 may be connected to the flow cell 120 using tubing 135 (e.g., food-grade silicone tubing).

The hyperspectral imaging device 110 (e.g., a Short-Wave Infrared (SWIR) hyperspectral camera) is configured to capture a hyperspectral image of the fluid in the flow cell 120 and generate a spectral signal based on the hyperspectral image. Hyperspectral imaging (HSI) is a technique that analyzes a wide spectrum of light instead of just assigning primary colors (e.g., red, green, blue) to each pixel. The light striking each pixel is broken down into many different spectral bands in order to provide more information on what is imaged. In aspects the hyperspectral imaging device 110 may use SWIR excitation.

The spectral signal includes SWIR spectra ranges from about 900 nm to about 2500 nm. The disclosed technology extracts the information from this range of spectra and finds a group of these wavelengths (i.e., signals) that are related to information or certain bands of signals of interest. In aspects, sample information may be obtained from the SWIR bands.

Short Wave Infrared (900 nm-2500 nm) excitation strikes a healthy balance between sensitivity to water and water environment changes, including the addition of salts. Because lactic acid is a carboxylic acid, lactic acid forms a detectable signal in the SWIR range. These acids form a carboxylic acid cyclic dimer in solution through hydrogen bonding, which causes a spectral shift and broadening that is visible as a baseline shift in the spectra.

SWIR is ideally suited for: (1) determining the extent of solvent-solute hydrogen bonding in solution. This is a direct reflection of the concentration of ions present in solution and can be used as a measure of acid/base ion formation in solution, for example; and (2) determining the hydration of a substance through the shifts of prominent water peaks.

For cells grown inside and outside of a bioreactor, constant pH is maintained using bicarbonate buffer. Outside the bioreactor, cell media is titrated to the desired pH, then bicarbonate salt is added to bring the osmolality of the solution back to a cell-appropriate level. Cells are then grown in an incubator which carefully maintains the $pCO_2$ of the media to maintain optimal pH. However, whenever the cell culture is taken out of the incubator, pH levels can rise within 2-3 hours. When cell culture is placed inside the incubator, the pH is reduced within about 1 hour. Bioreactors sparge the cell media with $CO_2$ gas to maintain optimal pH levels. Ideally, pH should be monitored and adjusted every few minutes rather than every few hours to maintain optimal cell growth.

The hyperspectral imaging device 110 may include a light source 150, such as a tungsten halogen light. The light source 150 may include a diffuser to more evenly distribute the light generated by the light source 150.

In aspects, the system 100 may also include a wireless transceiver 170 (e.g., Wi-Fi, and/or Bluetooth®) for wireless communication between the system 100 and the internet or another device (e.g., a laptop or a mobile device). For example, the hyperspectral images may be communicated wirelessly to a user device.

Figure 2:
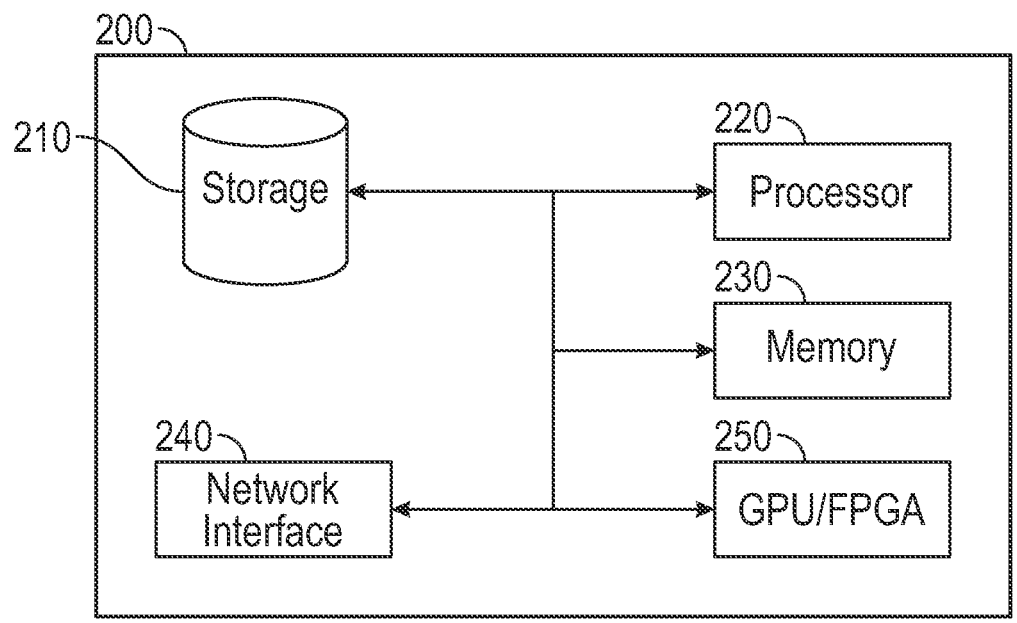
FIG. 2 is a block diagram of a controller configured for use with the system for detecting pH readings of FIG. 1, in accordance with aspects of the disclosure.

FIG. 2 illustrates controller 200 includes a processor 220 connected to a computer-readable storage medium or a memory 230. The controller 200 may be used to control and/or execute operations of the system 100. The computer-readable storage medium or memory 230 may be a volatile type of memory, e.g., RAM, or a non-volatile type of memory, e.g., flash media, disk media, etc. In various aspects of the disclosure, the processor 220 may be another type of processor, such as a digital signal processor, a microprocessor, an ASIC, a graphics processing unit (GPU), a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 230 can be random access memory, read-only memory, magnetic disk memory, solid-state memory, optical disc memory, and/or another type of memory. In some aspects of the disclosure, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In other aspects of the disclosure, the controller 200 may include a network interface 240 to communicate with other computers or to a server. A storage device 210 may be used for storing data. The disclosed method may run on the controller 200 or on a user device, including, for example, on a mobile device, an IoT device, or a server system.

Figure 3:
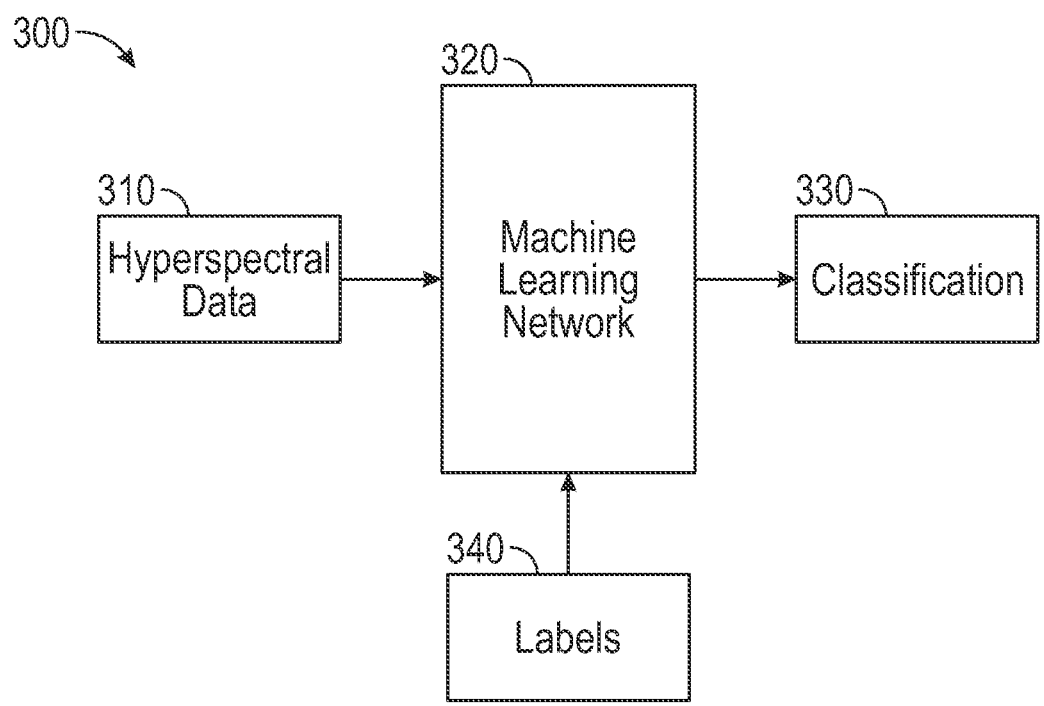
FIG. 3 is a block diagram of a machine learning network and inputs and outputs of a deep learning neural network, in accordance with aspects of the disclosure.

With reference to FIG. 3, a block diagram for a machine learning network 320 for classifying data in accordance with some aspects of the disclosure is shown. In some systems, a machine learning network 320 may include, for example, a convolutional neural network (CNN) and/or a recurrent neural network. A deep learning neural network includes multiple hidden layers. As explained in more detail below, the machine learning network 320 may leverage one or more classification models (e.g., CNNs, decision trees, Naive Bayes, k-nearest neighbor) to classify data The machine learning network 320 may be executed on the controller 200 (FIG. 2). Persons skilled in the art will understand the machine learning network 320 and how to implement it.

In machine learning, a CNN is a class of artificial neural network (ANN), most commonly applied to analyzing visual imagery. The convolutional aspect of a CNN relates to applying matrix processing operations to localized portions of an image, and the results of those operations (which can involve dozens of different parallel and serial calculations) are sets of many features that are delivered to the next layer. A CNN typically includes convolution layers, activation function layers, deconvolution layers (e.g., in segmentation networks), and/or pooling (typically max pooling) layers to reduce dimensionality without losing too many features. Additional information may be included in the operations that generate these features. Providing unique information that yields features that give the neural networks information can be used to provide an aggregate way to differentiate between different data input to the neural networks.

Figure 4:
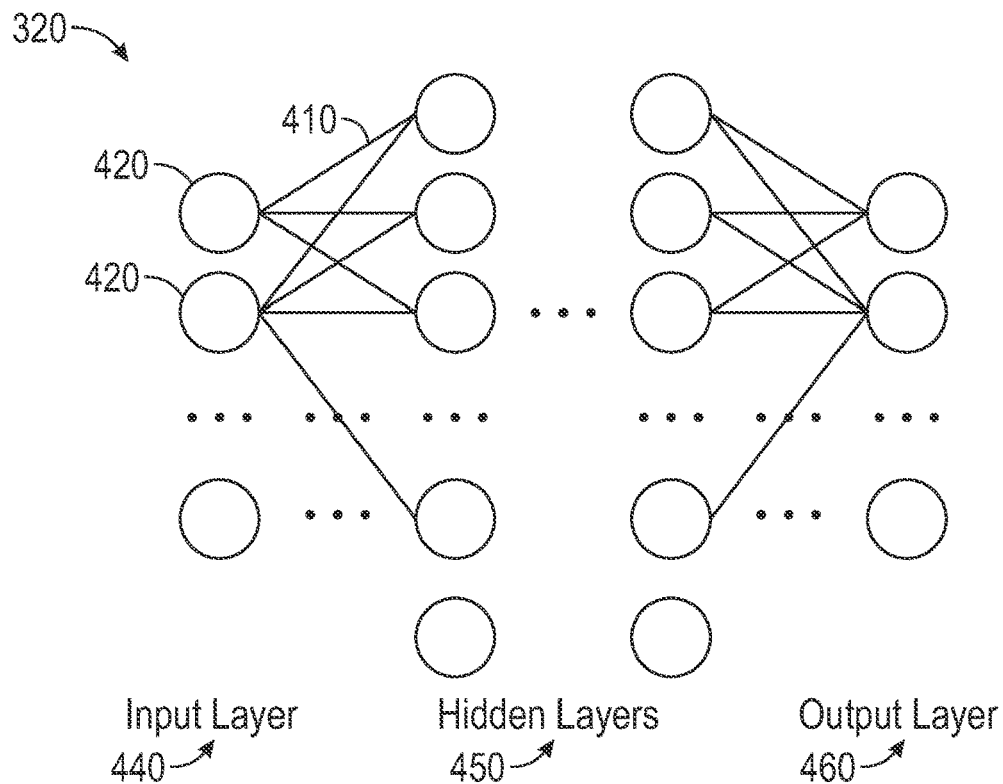
FIG. 4 is a diagram of layers of the deep learning neural network of FIG. 3 in accordance with aspects of the disclosure.

Referring to FIG. 4, generally, a machine learning network 320 (e.g., a convolutional deep learning neural network) includes at least one input layer 440, a plurality of hidden layers 450, and at least one output layer 460. The input layer 440, the plurality of hidden layers 450, and the output layer 460 all include neurons 420 (e.g., nodes). The neurons 420 between the various layers are interconnected via weights 410. Each neuron 420 in the machine learning network 320 computes an output value by applying a specific function to the input values coming from the previous layer. The function that is applied to the input values is determined by a vector of weights 410 and a bias. Learning, in the deep learning neural network, progresses by making iterative adjustments to these biases and weights. The vector of weights 410 and the bias are called filters (e.g., kernels) and represent particular features of the input (e.g., a particular shape). The machine learning network 320 may output logits. Although CNNs are used as an example, other machine learning classifiers are contemplated.

The machine learning network 320 may be trained based on labeling training data to optimize weights. For example, samples of the bioreactor fluid may be taken and labeled using measured pH values. In some methods in accordance with this disclosure, the training may include supervised learning or semi-supervised. Persons skilled in the art will understand training the machine learning network 320 and how to implement it.

Figure 5:
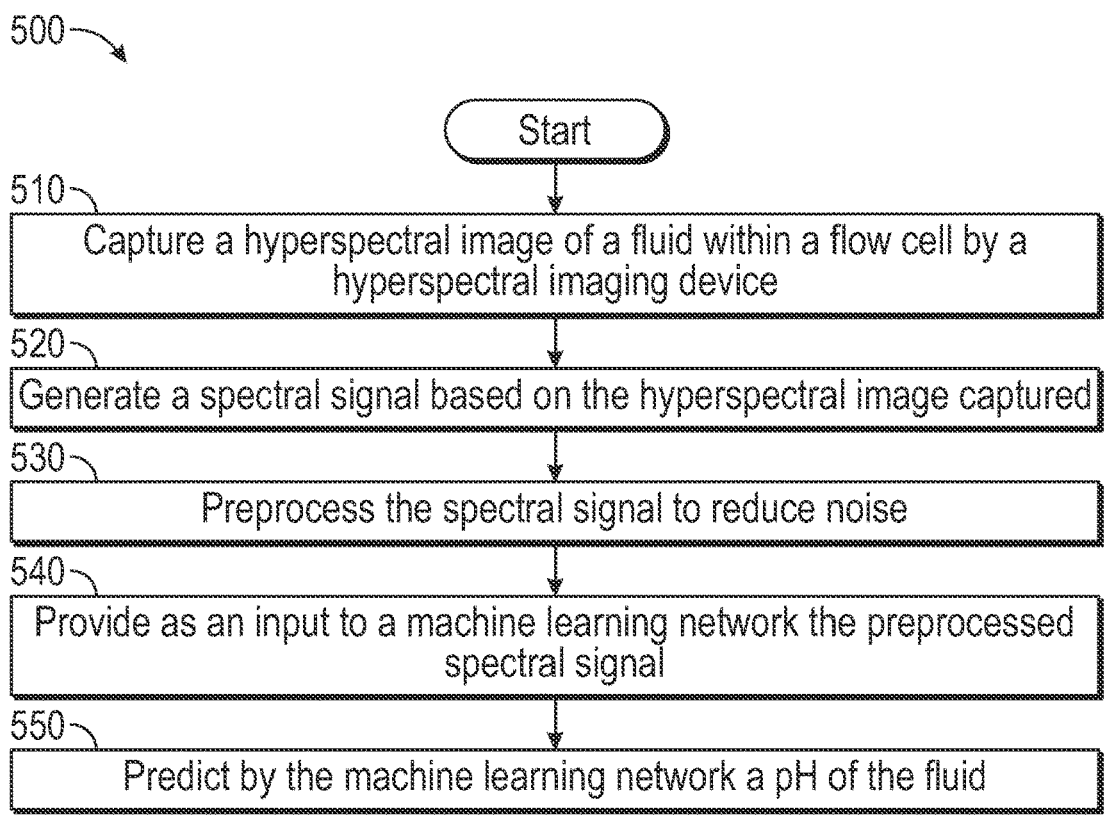
FIG. 5 is a flow diagram of a computer-implemented method for non-contact sensing of pH, in accordance with aspects of the present disclosure.

Referring to FIG. 5, a flow diagram for a method in accordance with the present disclosure for sensing the pH of bioreactor fluids is shown as 500. Although the steps of FIG. 5 are shown in a particular order, the steps need not all be performed in the specified order, and certain steps can be performed in another order. For example, FIG. 5 will be described below, with a controller 200 of FIG. 2 performing the operations. In aspects, the operations of FIG. 5 may be performed all or in part by another device, for example, a server, a mobile device, such as a smartphone, and/or a computer system. These variations are contemplated to be within the scope of the present disclosure.

Initially, at step 510, the controller 200 captures a hyperspectral image of a fluid within a flow cell 120 by a hyperspectral imaging device 110 (FIG. 1). The fluid may include a bioreactor fluid from a bioreactor 140. For example, a fluid may be pumped by the pump 130 from the bioreactor 140 to the flow cell 120 for imaging.

Next, at step 520, the controller 200 generates a spectral signal based on the captured hyperspectral image. The spectral signal may include thousands of SWR spectra.

Next, at step 530, the controller 200 may preprocesses the spectral signal. The controller 200 may convert the transmittance readings into absorbance readings using $A(x,y,\lambda) = -\log_{10}(R(x,y,\lambda))$, where $(R(x,y,\lambda))$ is the hyperspectral cubic image and $A(x,y,\lambda)$ is absorbance.

Wavelength regions from about 1100 to about 1800 nm may be used. Wavelength regions < about 1100 nm contain a low signal-to-noise ratio. The region around 1900 nm has an unusually high $H_2O$ absorption. In aspects, the region of interest may be cropped either manually or automatically. For example, the regions below a threshold value (e.g., about 1100 nm) may be cropped. Both background and noisy pixels may be removed using a z-score-based masking algorithm. Signal pixel intensities fall along a Gaussian curve for a homogeneous mixture of lactate in cell media. Next, an 8×8 mean filter in the XY image plane may be applied throughout the image to further reduce noise in spectra. Finally, the z-score may be used as a metric for filtering out noisy signals. For example, the system 100 may average over at least about 60 spectra to form a single denoised spectrum.

A variety of reference correction methods may be used for SWIR spectra, ranging from mean subtraction methods, baseline correction methods like Multiplicative Scatter Correction, and derivative-based smoothing methods like Savitzky-Golay derivation. Search, and subtraction of the sample signal by the closest matching pure solvent signal is particularly revealing of subtle shifts in the SWIR spectra caused by hydrogen bonding interactions between the aqueous solvent and solute.

Next, at step 540, the controller 200 provides the spectral signal as an input to a machine learning network 320. In aspects, the spectral signal may be preprocessed. SWIR excitations are highly nonlinear, therefore, modeling complex interactions between aqueous solvent and ionic solutes are quite difficult using quantum mechanics. Most existing chemometric methods assume the use of high spectral resolution instruments ($\Delta\lambda < 2$ nm) in order to detect subtle shifts in the water peak of the sample spectra. The hyperspectral imaging device 110 enables the collection of thousands of SWIR spectra from a single image taken within approximately a few milliseconds. For example, a machine learning network 320, such as a 1D convolution network, was fitted to Chinese ovary hamster cell (CHO) media samples collected within a single day. This 1D CNN was trained using the L1 loss, where y is the ground truth pH reading and $\hat{y}$ is the predicted pH reading.

$$L1\ loss = |y - \hat{y}|$$

Figure 6:
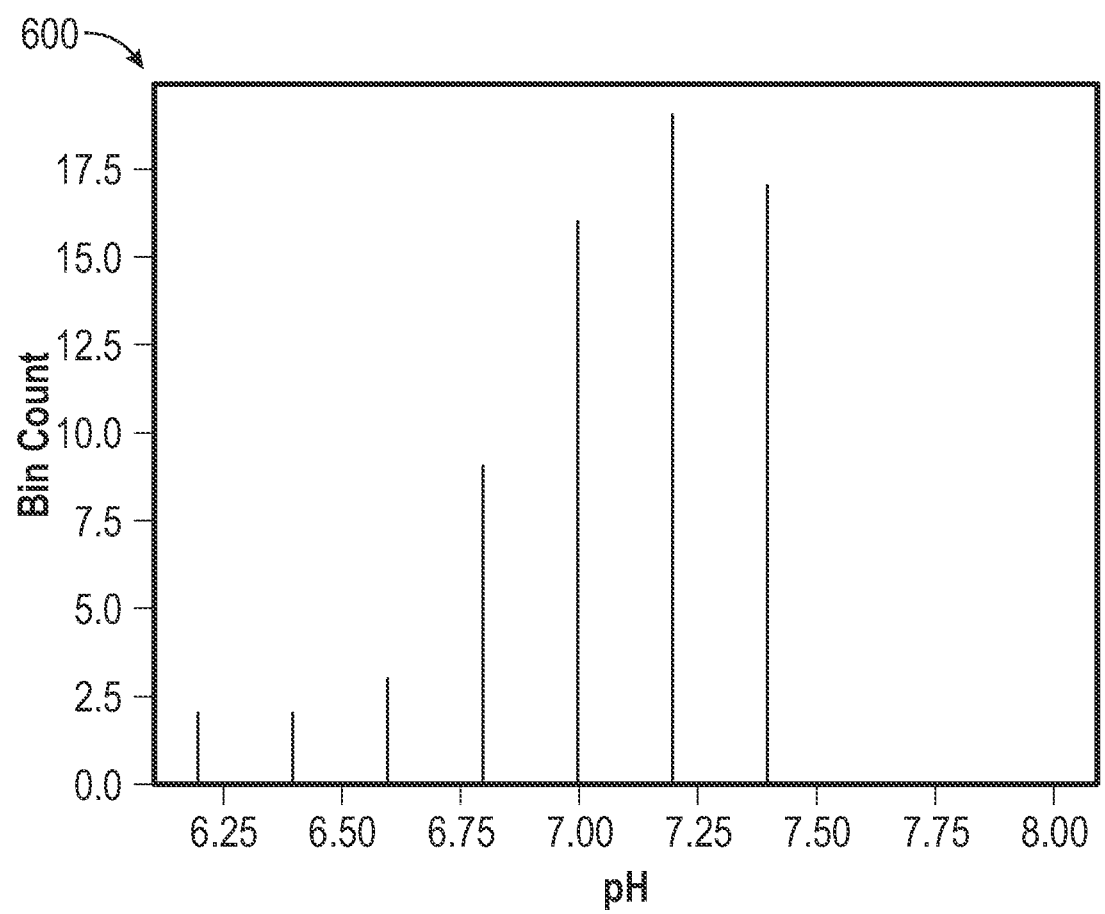
FIG. 6 is a histogram of Chinese ovary hamster cell (CHO) media sample pH values, in accordance with aspects of the present disclosure.

A large dataset consisting of CHO media samples collected over several weeks was compiled over several weeks to test the generalization of these developed models. A histogram of the collected data is shown in FIG. 6. The light source 150 of the hyperspectral camera varies slightly from day to day. To improve the generalization of models over multiple days of data collection, reference correction methods may be used (e.g., calibrating the equipment daily to overcome differences in lighting).

Next, at step 550, the controller 200 predicts by the machine learning network 320 a pH of the fluid being flown through the flow cell. The predicted pH may be displayed on a display. In aspects, the predicted pH may be used to actuate a device to adjust the $CO_2$ of a bioreactor in response to the predicted pH.

Figure 7:
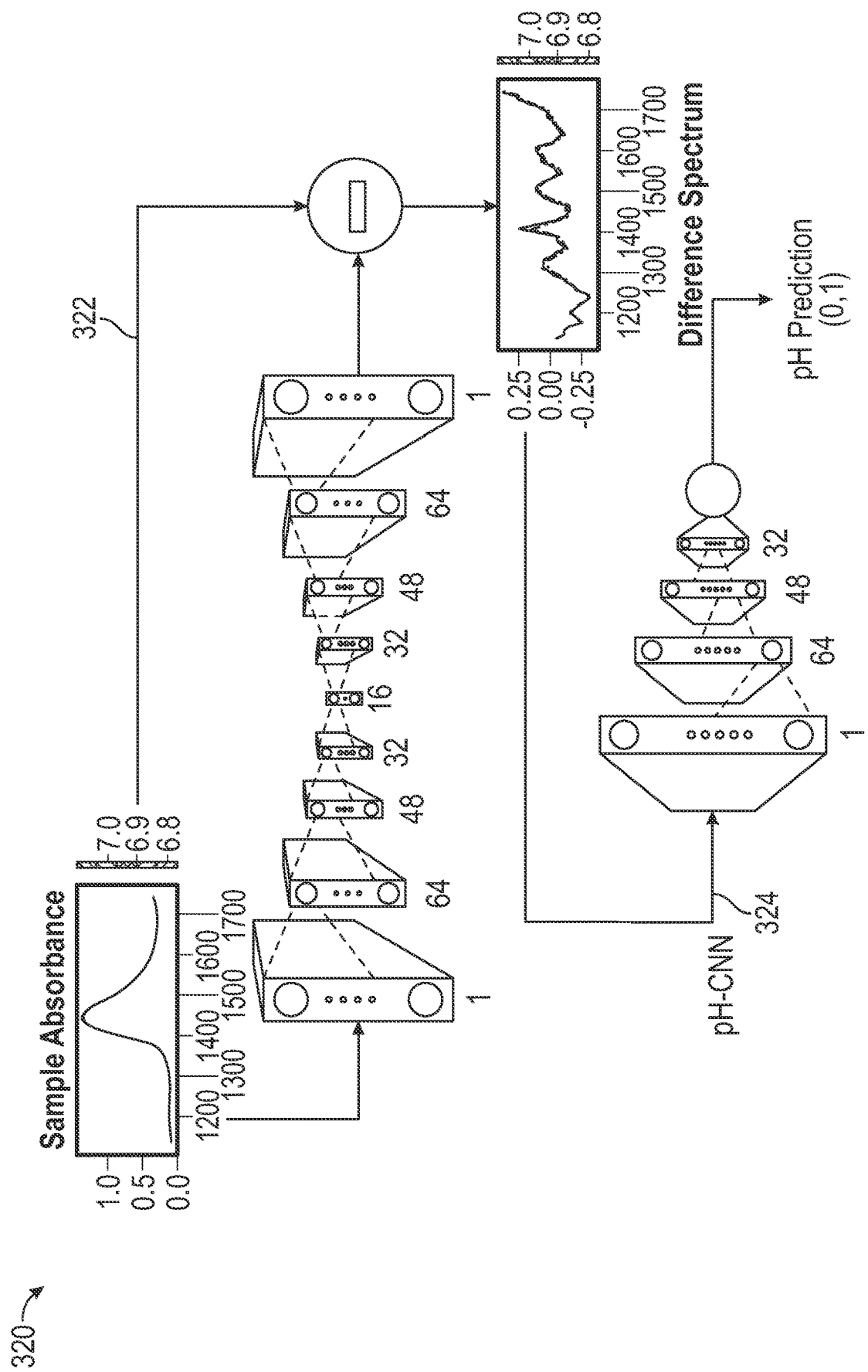
FIG. 7 is a block diagram illustrating an example of the machine learning network of FIG. 3, in accordance with aspects of the present disclosure.

FIG. 7 shows an example of the machine learning network 320 that may be used. The machine learning network 320 may be trained using a weighted combination of the mean-squared error (MSE) 322 loss and Pearson's correlation coefficient between the bands and the measured pH values 324:

$$AE\ loss = w_1 * \|X - \hat{X}\| + w_2 * \frac{\sum(X_i - \overline{X})(y_i - \overline{y})}{\sqrt{\sum(X_i - \overline{X})^2 \sum(y_i - \overline{y})^2}},$$

where $w_1$ and $w_2$ represent weights applied to each component of the loss function. X represents the sample spectrum, $\hat{X}$ represents an autoencoder-produced replica, and $\overline{X}$, $\overline{y}$ represent the average of a batch of spectra signal X and ground truth pH values y, respectively.

This autoencoder (machine learning network 320) may be trained exclusively using an evenly sampled dataset consisting of pure deionized water samples mixed with random amounts of lactic acid and sodium bicarbonate.

Figure 8:
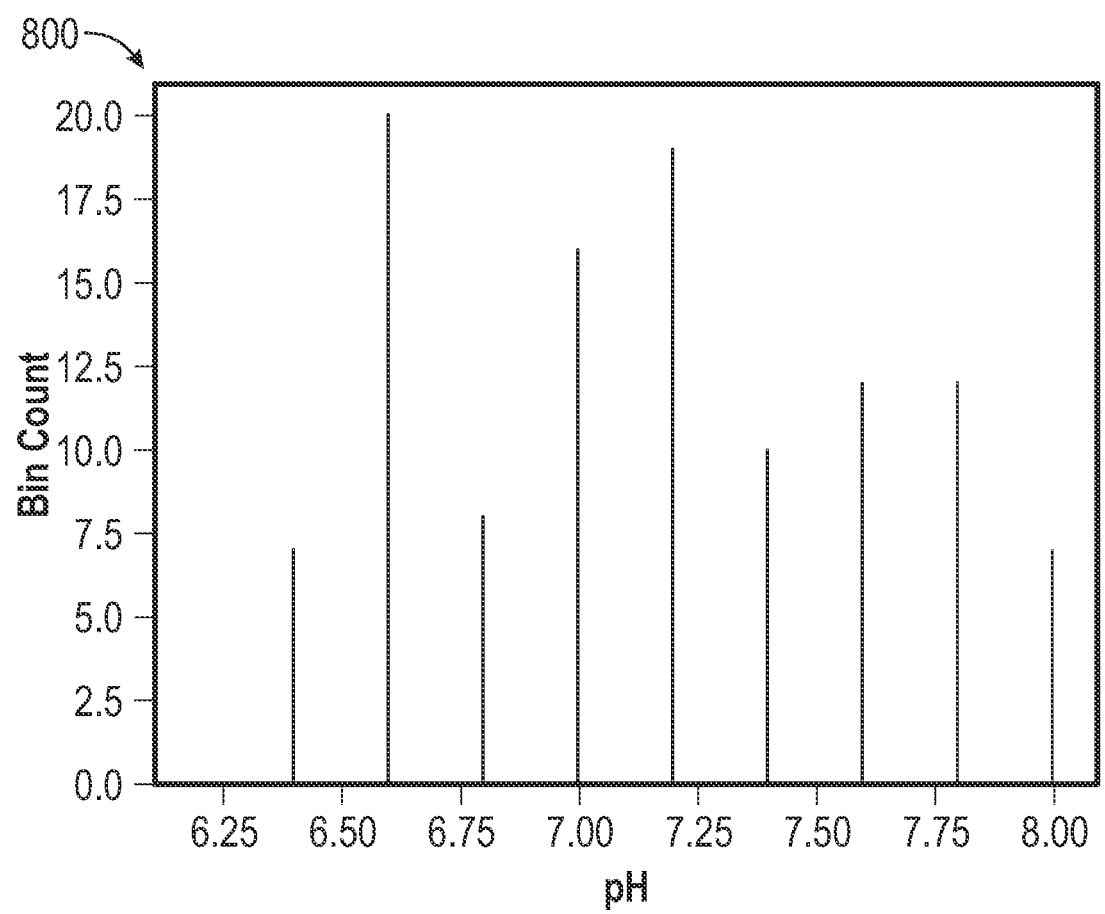
FIG. 8 is a histogram of deionized water, lactic acid, and NaOH mixtures sample pH values, in accordance with aspects of the present disclosure.

FIG. 8, a histogram of deionized water, lactic acid, and NaOH mixtures sample pH values. pH values were normalized prior to machine learning network training. In an aspect of the disclosure, the machine learning network 320 was trained exclusively using an evenly sampled dataset consisting of pure deionized water samples mixed with random amounts of lactic acid and sodium bicarbonate. The pH values were normalized prior to machine learning network 320 training.

Figure 9A:
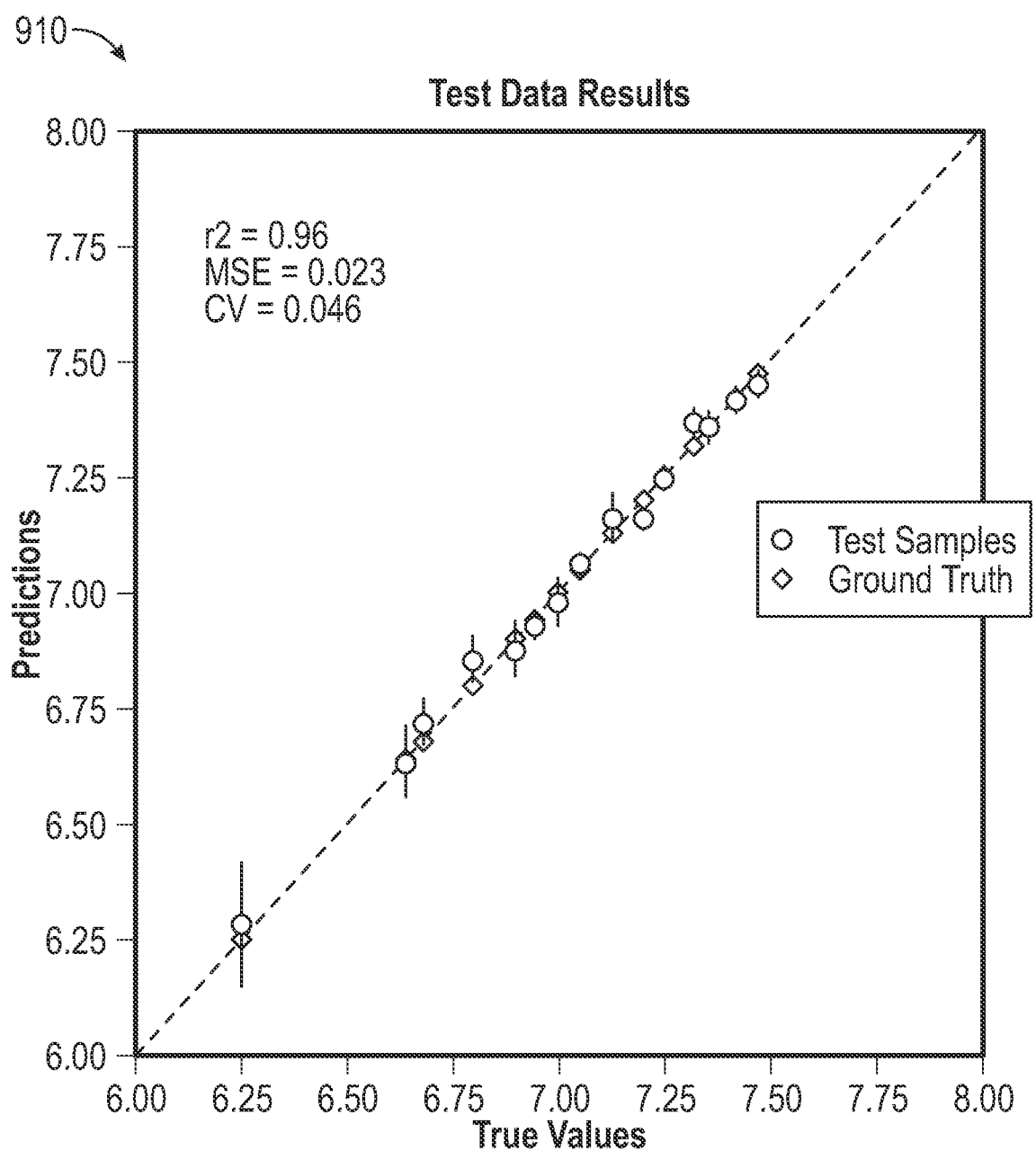
FIGS. 9A and 9B are graphs illustrating test data results and training data results plotted against actual values, in accordance with aspects of the present disclosure.
Figure 9B:
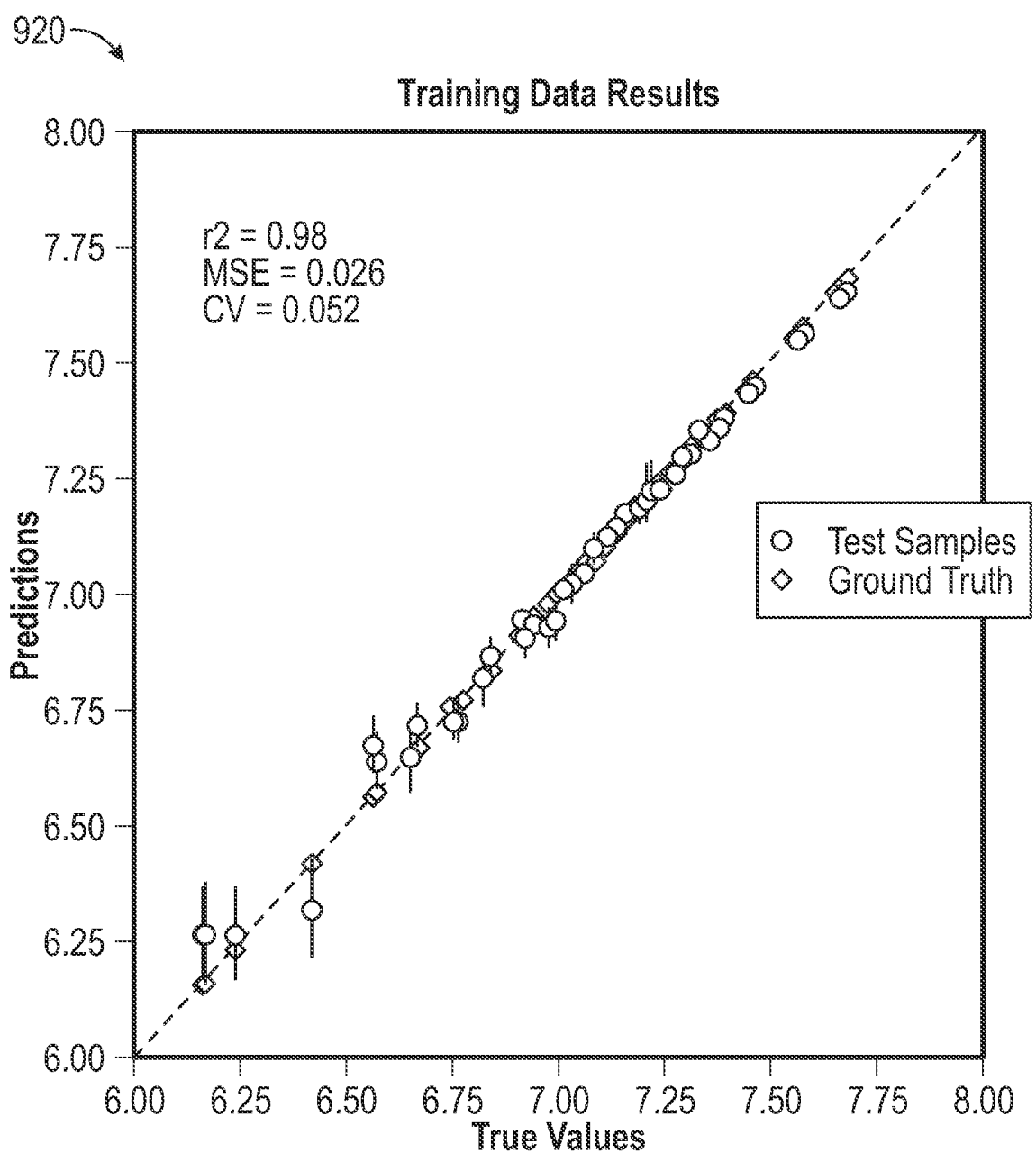

Referring to FIGS. 9A and 9B, graphs illustrating test data results and training data results plotted against actual values are shown. At first a dataset collected from a single day of pH readings in CHO cell media was evenly sampled, with every fourth pH sample reserved as test data. The data illustrated in FIG. 9A was generated by first adding NaOH until the pH reached about 8, then adding lactic acid until the pH reached about 7.5 and repeating this cycle a few times. This procedure allowed for the accumulation of lactic acid and NaOH within the solution and caused an easily discernible shift. This method of pH variation reflects how cells gradually add lactic acid to the cell media through glycolytic respiration.

Figure 10:
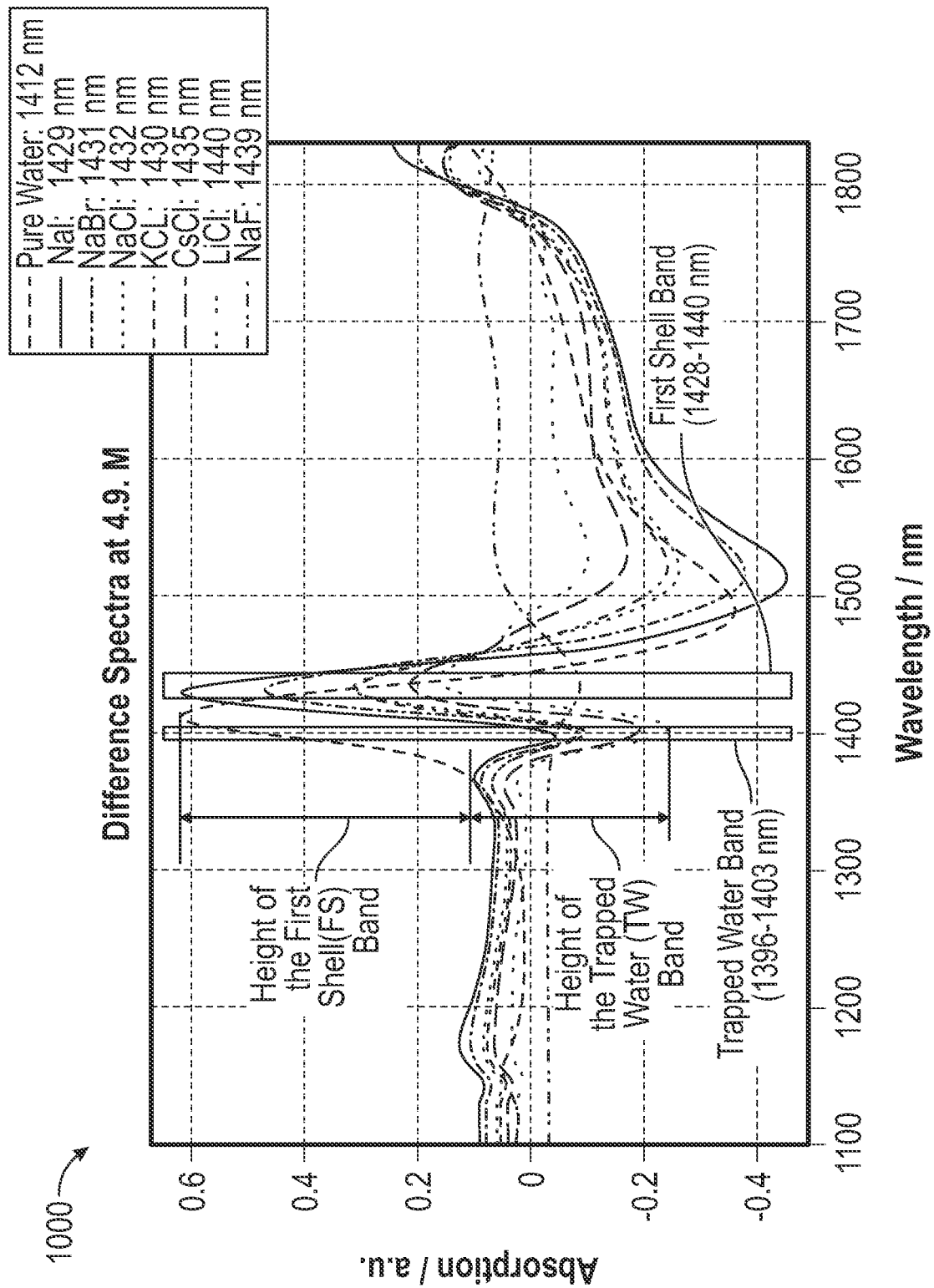
FIG. 10 is a graph illustrating the difference spectra of Short-Wave Infrared (SWIR) spectra of various ionic solutions, in accordance with aspects of the present disclosure.
Figure 11:
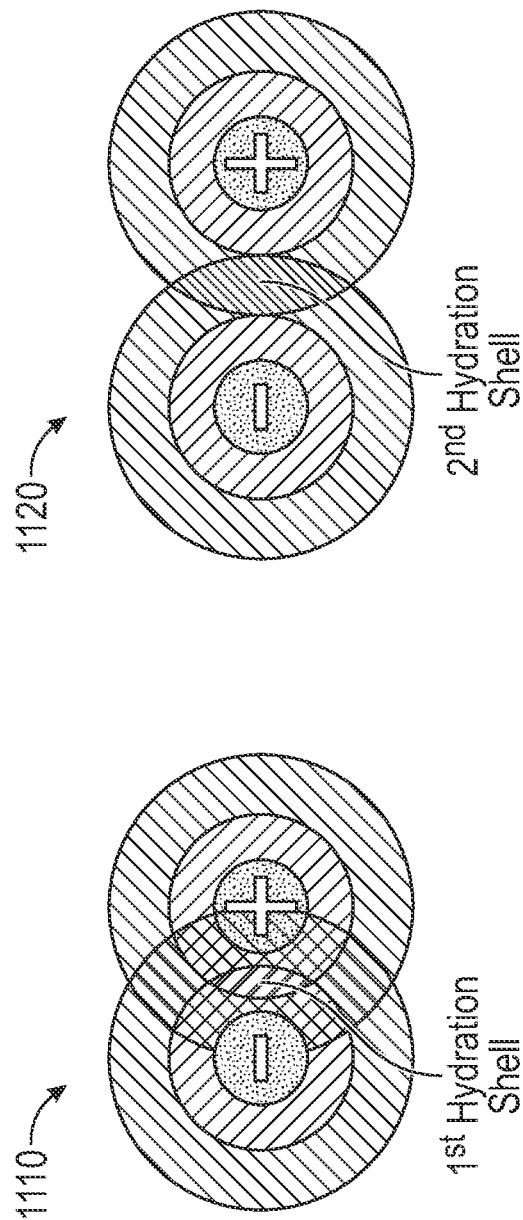
FIG. 11 is a diagram illustrating underlying hydrogen bonding interactions in an aqueous solution with an ion present, in accordance with aspects of the present disclosure.

Referring to FIGS. 10 and 11, a graph illustrating difference spectra of SWIR spectra of various ionic solutions (FIG. 10) and a diagram illustrating underlying hydrogen bonding interactions in aqueous solution with an ion present (FIG. 11). FIG. 10 illustrates that when using a traditional FTIR (Fourier Transform Infrared) spectroscopy instrument with < approximately 2 nm wavelength resolution, the difference spectrum reveals a few subtle patterns.

When a high concentration of ions traps water in the first hydration shell 1110, the TW tapped water band is visible (1395-1405 nm). The first shell hydration band 1110 is also visible and causes an increased blue shift with the increasing electronegativity of the solute ion (1490-1750). The hydrogen-bonding interactions of water force the water to act as a molecular mirror of the dissolved solutes inside it. This makes SWIR invisible solutes like ions visible. Usually, water is seen as a hindrance to SWIR spectroscopy since the absorption signal is so large. However, when viewed from this frame of thought, water becomes a mirror of the complex molecular environment within the solution. Specific bands are affected by water perturbation. The shape and position of these bands act as a mirror to the solvent-solute interactions present. Since SWIR spectra reflect the aqueous environment through subtle shifts and perturbations, it makes sense to isolate and filter these shifts from the rest of the spectrum.

Figure 12:
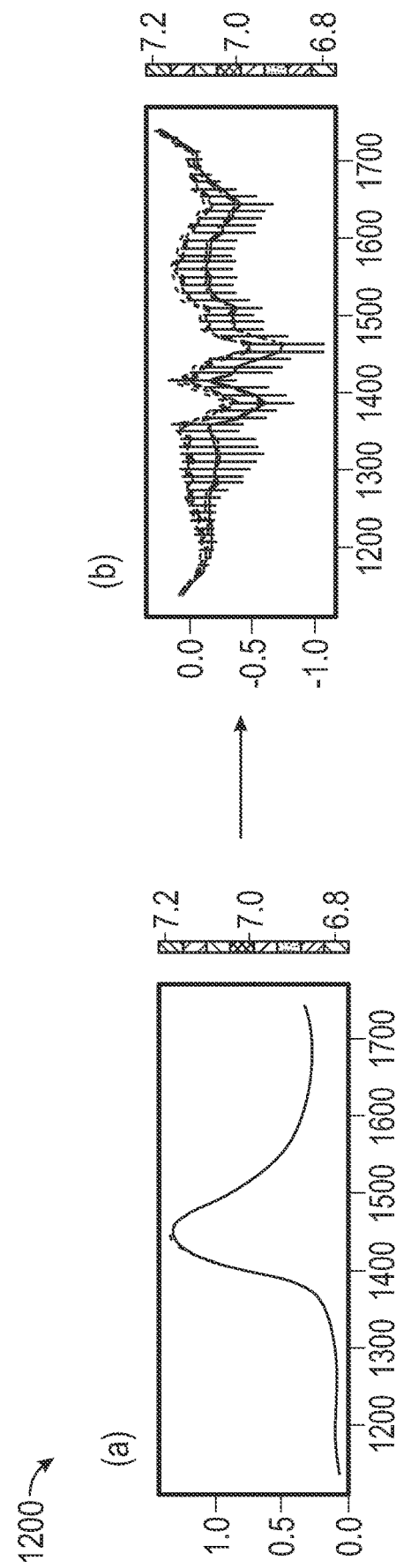
FIG. 12 is a graph illustrating a comparison of spectra before reference correction, in accordance with aspects of the present disclosure.

Referring to FIG. 12, a graph illustrating a comparison of spectra before reference correction is shown. A 1D convolutional autoencoder (e.g., machine learning network 320 of FIG. 7) was trained to extract the static signal from each sample signal for subsequent reference subtraction. The machine learning network 320 was trained to maximize the correlation between spectra bands in the difference spectra and target pH. In order to preserve the generalization of results, this machine learning network 320 was trained exclusively using an evenly sampled dataset consisting of pure deionized water samples mixed with random amounts of lactic acid and sodium bicarbonate. This dataset was not seen by the pH CNN.

Figure 13A:
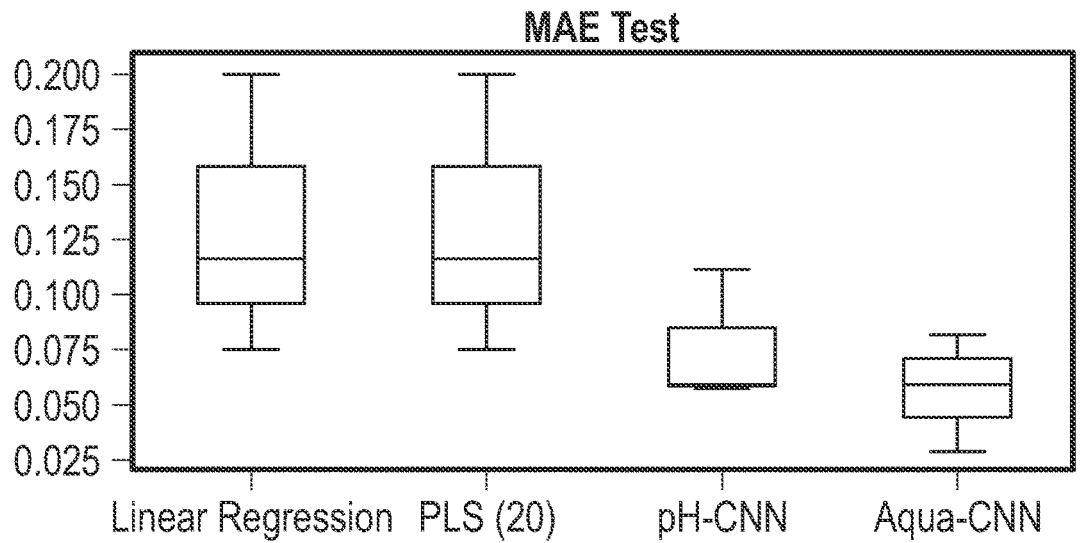
FIGS. 13A and 13B are diagrams illustrating MAE (mean absolute error) and RMSE (root mean squared error) test error, in accordance with aspects of the present disclosure.
Figure 13B:
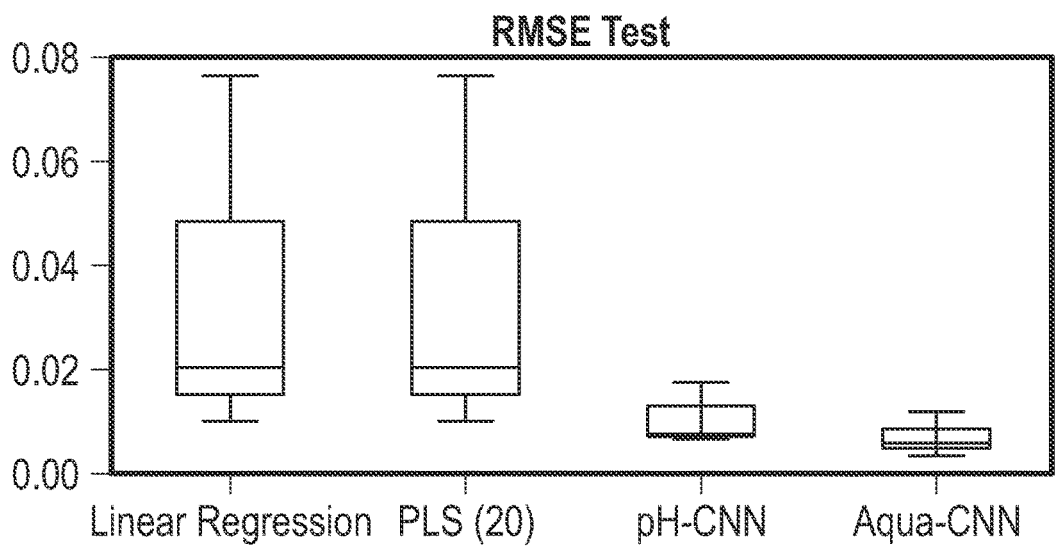
Figure 14A:
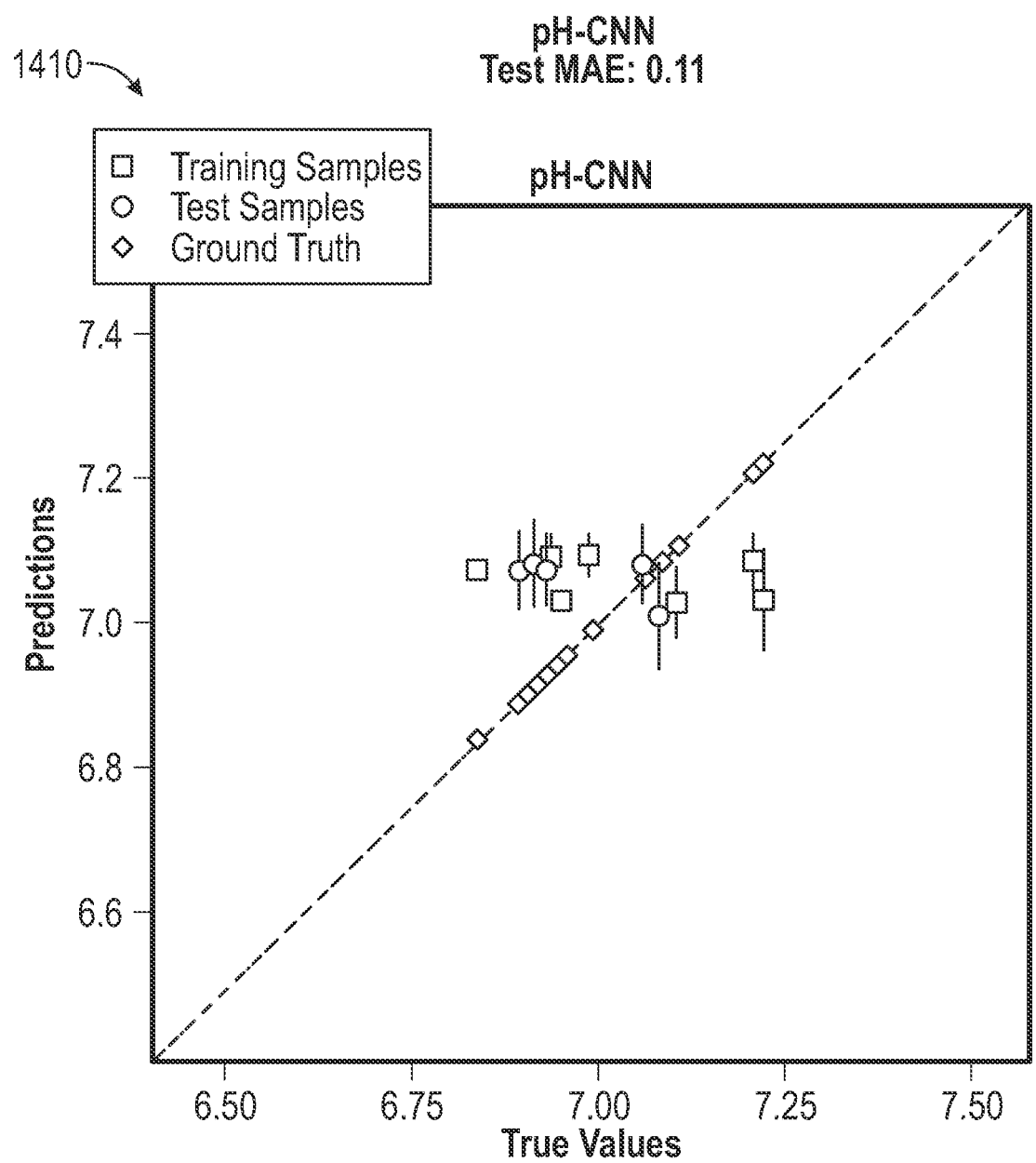
FIGS. 14A-D are graphs illustrating a comparison of band activations and prediction MAE, in accordance with aspects of the present disclosure.
Figure 14B:
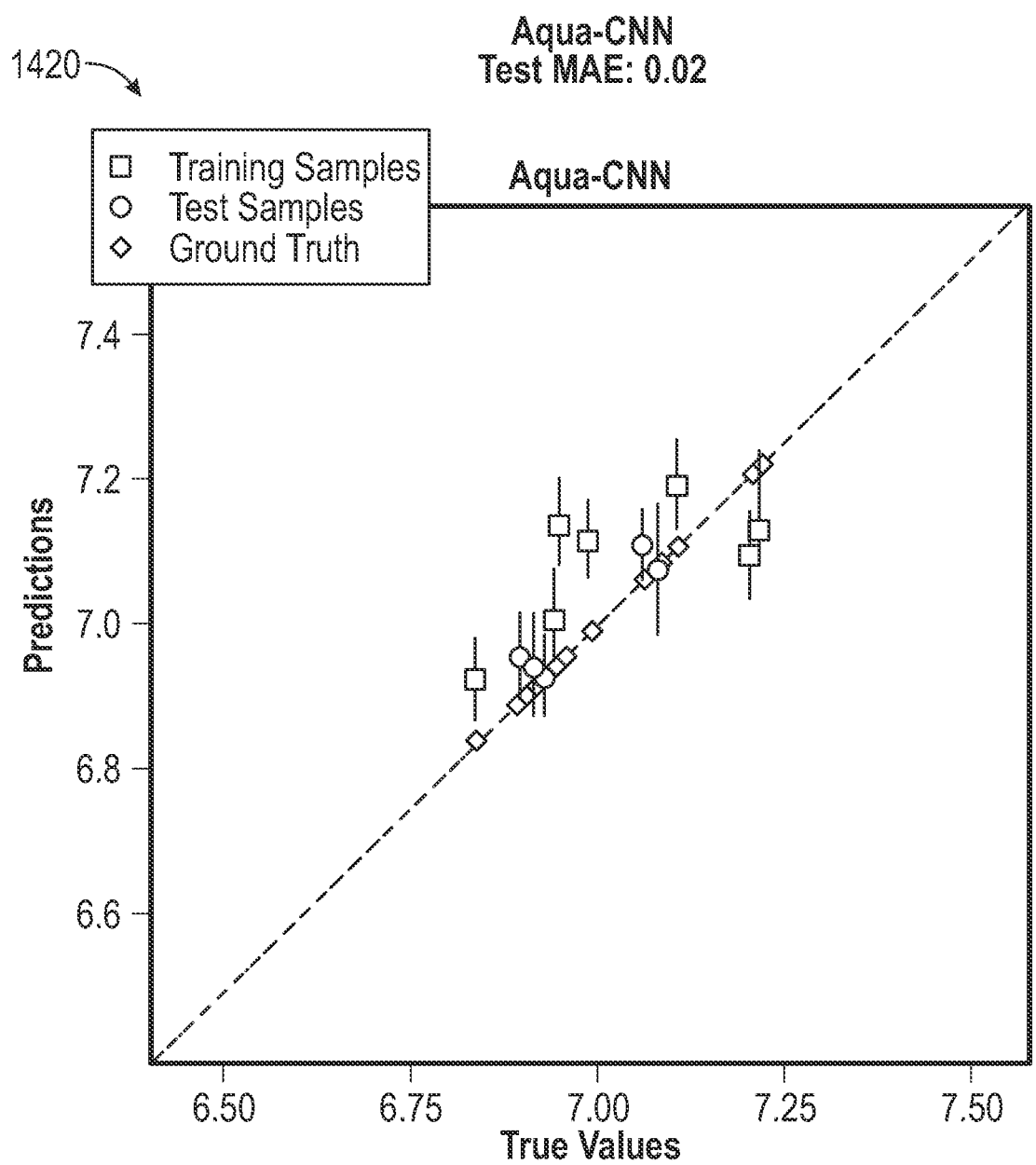
Figure 14C:
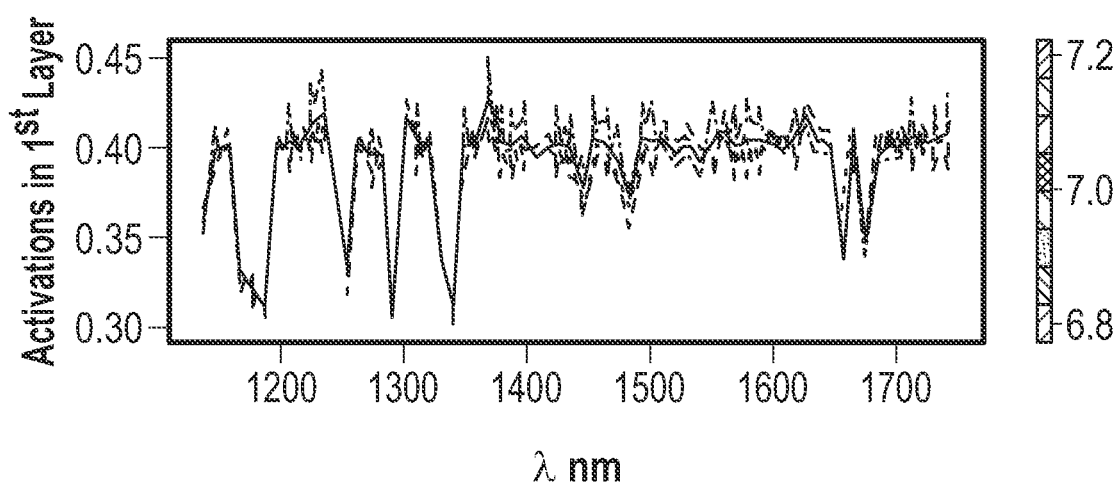
Figure 14D:
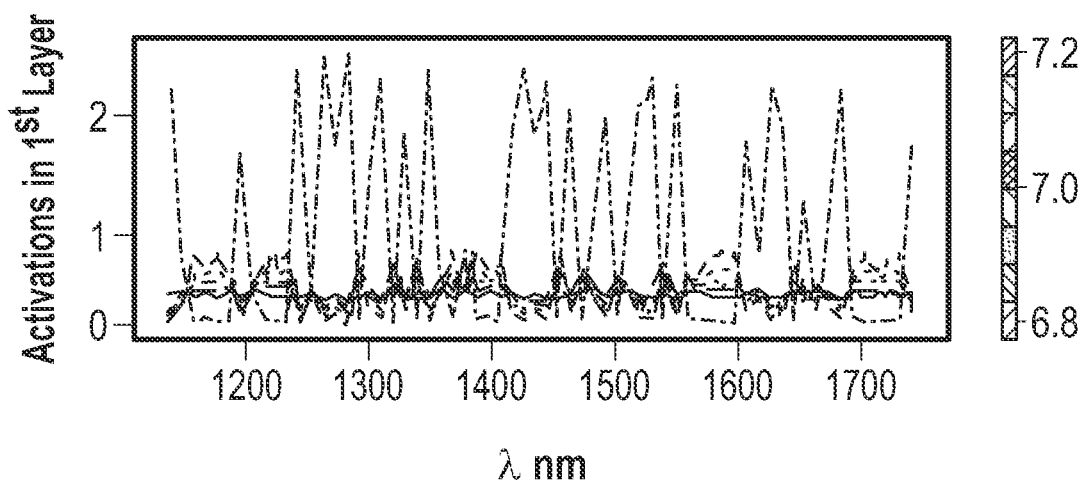

Referring to FIGS. 13A-B, diagrams illustrating MAE (mean absolute error) and RMSE (root mean squared error) test error are shown. FIGS. 13A-B summarize the prediction accuracy across linear regression, PLS, pH-CNN, and AQUA-CNN for all cross-validation folds. Cross-validation folds are extracted from a large CHO cell media dataset collected over several weeks, as illustrated in FIG. 6.

Referring to FIGS. 14A-D, graphs illustrating a comparison of band activations and prediction MAE are shown. FIGS. 14A-D illustrate the band activations and prediction MAE for the first cross-validation using: (a) pH-CNN 1410 and 1430 and (b) AQUA-CNN 1420 and 1440. When using AQUA-CNN, activations in the first convolutional layer of pH CNN are both stronger (maximum activation for AQUA-CNN is approximately four times larger) and more precise, leading to a 20-fold reduction in the test prediction error.

Chemometric models act as a black box of sorts. Chemometric models are simple to implement, but it is difficult to interpret the physical meaning behind the acquired signals. The first layer activations of the trained pH CNN network may act as a rough indication of where the CNN network "pays attention." In aspects, the use of soft attention may improve the generalization of the trained CNN network even further.

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various aspects of the present disclosure may include all, some, or none of the enumerated advantages and/or other advantages not specifically enumerated above.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an aspect," "in aspects," "in various aspects," "in some aspects," or "in other aspects" may each refer to one or more of the same or different example Aspects provided in the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The aspects described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A non-contact system for sensing of pH, the system comprising:
   a hyperspectral imaging device configured to capture a hyperspectral image of a fluid;
   a flow cell configured to enable the capturing of a hyperspectral image of a fluid;
   a processor; and
   a memory including instructions stored thereon, which, when executed by the processor, cause the system to:
      generate a hyperspectral image of the fluid in the flow cell;
      generate a spectral signal based on the hyperspectral image;
      provide the spectral signal as an input to a machine learning network; and predict by the machine learning network a pH of the fluid.

2. The system of claim 1, further comprising a pump configured to pump a cell media into the flow cell.

3. The system of claim 1, further comprising a cell media filter configured to filter the fluid prior to the media being flowed into the flow cell.

4. The system of claim 1, wherein the machine learning network includes a convolutional neural network.

5. The system of claim 1, wherein the flow cell includes a transparent window configured for imaging the fluid.

6. The system of claim 1, wherein the instructions, when executed by the processor, further cause the system to preprocess the spectral signal to reduce noise, before providing the spectral signal to the machine learning network.

7. The system of claim 1, wherein the spectral signal includes transmittance readings, and
wherein the instructions, when executed by the processor, further cause the system to convert the transmittance readings into absorbance readings.

8. The system of claim 7, wherein the transmittance readings are converted into absorbance readings using $A(x,y,\lambda)=-\log_{10}(R(x,y,\lambda))$ $(R(x,y,\lambda))$ is the hyperspectral cubic image, and $A(x,y,\lambda)$ is absorbance.

9. The system of claim 7, wherein the instructions, when executed by the processor, further cause the system to filter in an XY image plane to reduce noise in the absorbance readings.

10. The system of claim 9, wherein the instructions, when executed by the processor, further cause the system to perform z-score based masking to further remove background and noisy pixels from the absorbance readings.

11. A computer-implemented method for sensing pH, the method comprising:
capturing a hyperspectral image of a fluid within a flow cell by a hyperspectral imaging device;
generating a spectral signal based on the hyperspectral image captured;
providing the spectral signal as an input to a machine learning network; and
predicting by the machine learning network a pH of the fluid.

12. The computer-implemented method of claim 11, further comprising pumping a filtered fluid into the flow cell by a pump.

13. The computer-implemented method of claim 11, further comprising filtering the fluid by a cell media filter prior to the flowing of the fluid through the flow cell.

14. The computer-implemented method of claim 11, wherein the machine learning network includes a convolutional neural network.

15. The computer-implemented method of claim 11, wherein the hyperspectral image is captured within a transparent window of the flow cell.

16. The computer-implemented method of claim 11, further comprising preprocessing the spectral signal to reduce noise, before providing the spectral signal to the machine learning network.

17. The computer-implemented method of claim 11, further comprising converting transmittance readings from the spectral signal to absorbance readings.

18. The computer-implemented method of claim 17, further comprising filtering the absorbance readings in an XY image plane to reduce noise in the absorbance readings.

19. The computer-implemented method of claim 18, further comprising performing z-score based masking to further remove background and noisy pixels from the absorbance readings.

20. The computer-implemented method of claim 11, wherein the hyperspectral imaging device is a short-wave infrared hyperspectral imaging device.

21. A non-transitory computer-readable medium storing instructions which, when executed by a processor, cause the processor to perform a computer-implemented method for hyperspectral imaging comprising:
generating a hyperspectral image of a fluid within a flow cell by a hyperspectral imaging device;
generating a spectral signal based on the hyperspectral image captured;
providing the spectral signal as an input to a machine learning network; and
predicting by the machine learning network a pH of the fluid.

* * * * *